US008539042B2

(12) United States Patent
    Liu et al.

(10) Patent No.: US 8,539,042 B2
(45) Date of Patent: Sep. 17, 2013

(54) METHOD FOR ESTABLISHING A NETWORK PLATFORM FOR RENTING THE ELECTRONIC PUBLICATIONS

(75) Inventors: Xingxie Liu, Shanghai (CN); Qin Zhang, Shanghai (CN); Guowei Xu, Shanghai (CN); Ning Liu, Shanghai (CN)

(73) Assignee: Shanghai Gaozhi Science and Technology Development Co. Ltd., Shanghai (CN)

( * ) Notice: Subject to any disclaimer, the term of this patent is extended or adjusted under 35 U.S.C. 154(b) by 47 days.

(21) Appl. No.: 13/169,577

(22) Filed: Jun. 27, 2011

(65) Prior Publication Data

US 2011/0258672 A1    Oct. 20, 2011

Related U.S. Application Data

(60) Division of application No. 12/039,906, filed on Feb. 29, 2008, now abandoned, and a continuation of application No. PCT/CN2006/000924, filed on May 9, 2006.

(51) Int. Cl.
    *G06F 15/16* (2006.01)
    *H04N 7/173* (2011.01)

(52) U.S. Cl.
    USPC ............................................. 709/218; 725/93

(58) Field of Classification Search
    USPC .......................................... 709/218; 725/93
    See application file for complete search history.

(56) References Cited

U.S. PATENT DOCUMENTS 8,166,508 B2 * 4/2012 Mitsuji et al. .................. 725/93

8,346,807 B1 * 1/2013 Diamond et al. ............. 707/783
2002/0032905 A1 * 3/2002 Sherr et al. ...................... 725/38

(Continued)

FOREIGN PATENT DOCUMENTS

CN    1395211 A    2/2003
CN    1595903 A    3/2005

OTHER PUBLICATIONS

International Preliminary Report on Patentability issued on Dec. 27, 2007 in connection with International Patent Application No. PCT/CN2006/000924 filed on May 9, 2006, 4 pages.

(Continued)

*Primary Examiner* — Imad Hussain
(74) *Attorney, Agent, or Firm* — Gesmer Updegrove LLP (57) ABSTRACT

A method for establishing a network platform for renting the electronic publications adopts a grid algorithm, links to the Internet via various networks, and establishes the network platform having an information service grid character for renting the electronic publication. Three types of nodes are established in the information service grid: a first type of node is established as service domain owner and the administrator grid node; a second type of node is established as service provider grid node that is composed of the consumers of the electronic publication; and the third type of node is established as the service provider grid node which is composed of the publishers of the electronic publication; the three types of node provide the network information service by utilizing the grid computing mode and the SOAP. The service provider grid nodes can do online maintenance on the content of the electronic publication provided by them and collect the charge. And the service consumer grid nodes can obtain the service provided by the service provider nodes through the variant service paths, which are provided by the service domain owner and the administrator grid nodes, and pay the service fee.

3 Claims, 5 Drawing Sheets

(56) References Cited

U.S. PATENT DOCUMENTS

| | | | |
|---|---|---|---|
| 2002/0073033 A1* | 6/2002 | Sherr et al. | 705/51 |
| 2002/0186843 A1* | 12/2002 | Weinstein et al. | 380/201 |
| 2004/0013924 A1 | 1/2004 | Park et al. | |
| 2004/0076298 A1* | 4/2004 | Oliver | 380/231 |
| 2004/0139024 A1* | 7/2004 | So | 705/51 |
| 2004/0254999 A1 | 12/2004 | Bulleit et al. | |
| 2005/0177624 A1* | 8/2005 | Oswald et al. | 709/219 |
| 2006/0053066 A1* | 3/2006 | Sherr et al. | 705/26 |
| 2006/0053216 A1* | 3/2006 | Deokar et al. | 709/223 |
| 2006/0168156 A1* | 7/2006 | Bae et al. | 709/220 |
| 2007/0036303 A1* | 2/2007 | Lee et al. | 379/93.28 |
| 2007/0112686 A1* | 5/2007 | Chatani et al. | 705/64 |
| 2007/0271455 A1* | 11/2007 | Nakano et al. | 713/154 |
| 2008/0046718 A1* | 2/2008 | Grab et al. | 713/156 |
| 2008/0085005 A1* | 4/2008 | Jung et al. | 380/282 |
| 2008/0209067 A1* | 8/2008 | John et al. | 709/231 |
| 2008/0288770 A1* | 11/2008 | Kline et al. | 713/150 |

OTHER PUBLICATIONS

Written Opinion of the International Searching Authority issued on Aug. 7, 2006 in connection with International Patent Application No. PCT/CN2006/000924 filed on May 9, 2006, 3 pages.

* cited by examiner

METHOD FOR ESTABLISHING A NETWORK PLATFORM FOR RENTING THE ELECTRONIC PUBLICATIONS

PRIORITY

This application is a divisional application of U.S. patent application Ser. No. 12/039,906 filed on Feb. 29, 2008, which claims priority to PCT/CN2006/000924 filed on May 9, 2006.

TECHNICAL FIELD

The present invention relates to a method for establishing a network platform for electronic publication renting, and more particularly, to establishing a group of service administration grid nodes, service provision grid nodes, and a group of service request grid nodes to constitute the electronic publication renting network platform through various network access approaches (e.g. Internet, Satellite communication network, cable television network, wireless broadband network, computer network and local telephone network, etc.). Numerous service request grid nodes on the electronic publication renting network platform are able to acquire various customized electronic publication services published by numerous service provision grid nodes. The transactions as a result of the services are calculated by corresponding service administration grid nodes, corresponding service provision grid nodes and corresponding service request grid nodes, which are related to the service transaction.

BACKGROUND

With the fact that the electronic publications publish at different locations and time, and in order to reduce the spatial and time limitation, there is an increasing demand that electronic publication consumers consume electronic publications in network environment. The electronic publication consumers demand customized electronic publication consumption. Meanwhile, the electronic publications of the electronic publication publishers also require a one-time publication to spread all over the world. Therefore, exchanges such as information and contents exchange between the electronic publication consumers and the electronic publication publishers are required. An information service platform is needed to converge floods of electronic publication resources from numerous electronic publication publishers in a virtual space with Digital Rights Management (DRM). An information service platform is also needed to provide highly efficient information services and electronic business when numerous electronic publication consumers acquire or rent the electronic publications.

Since electronic publication publishers or electronic publication consumers locate worldwide and their spatial and time locations differ, thus, the grid technology is a main background technology that is more adapted to the information service having different space and time location. The background technologies also include middleware technology, Peer-to-Peer (P2P), Web Service, Open Grid Services Architecture (OGSA), etc.

SUMMARY

The object of the present invention is to provide a method for establishing distributed electronic publication resources that have Digital Rights Management feature and can be added or deleted at any time. Meanwhile, the method enables the electronic publication publisher group and the electronic publication consumer group to conduct electronic business transaction. According to the present invention that adopts information technology, the differences of heterogeneous resource among the group of service request grid nodes are eliminated are eliminated, where the group of service provision grid nodes comprises an electronic publication publisher group, and the group of service request grid nodes comprises an electronic publication consumer group. In this way, it is possible for the electronic publication publisher group to conduct content publication and content renting with electronic publication copyright protection and to obtain corresponding compensation after services are provided to the electronic publication consumer group. The electronic publication consumer group is able to acquire services such as renting and purchasing services provided by the electronic publication publisher group in a customized space and time. The method ensures effective management and recordation for the publication and consumption of the electronic publications.

To these ends, the technical solution adopted by the establishing method of the present invention has three characteristics:

The first characteristic is to establish three groups of grid nodes, which comprises:

Establishing a group of service administration grid nodes, wherein the group of service administration grid nodes may access to the platform via various communication links, add or delete a service administration grid node at any moment, and undertake to control and schedule grid computing;

Establishing a group of service provision grid nodes including a electronic publication publisher group, wherein the group of service provision grid nodes may access to the platform via various communication links, add or delete a service provision grid node at any moment, undertake to provide the property and content of electronic publications, and conduct on-line maintenance on the content of the electronic publications provided by the service provision grid nodes;

Establishing a group of service request grid nodes including an electronic publication consumer group, wherein the group of service request grid nodes may access to the platform via various communication links, add or delete a service request grid node at any moment. The service request grid node may acquire services through service paths provided by the group of service administration grid nodes and undertake property browse and content playback for the electronic publications.

The second characteristic is that the service request grid node may be disconnected from the network and use the general television set to play service content after acquiring the property and content of the electronic publication.

The third characteristic is that after the service request grid node uses the service, an electronic business relation will be established between the service request grid node and the corresponding service administration grid node and corresponding service provision grid node to complete payment for the electronic publication renting service fee in a future network connecting.

The foregoing service provision grid node group and service request grid node group communicate grid service content and property information via the service administration grid node group and provide services to establish the electronic publication renting network platform (hereinafter platform) of the present invention with the support of one service administration grid node from the service administration grid node group.

On the foregoing established platform, the three types of grid nodes including the service administration grid nodes composed of the platform operators, the service provision grid nodes composed of the electronic publication publishers, and the service request grid nodes composed of the electronic publication consumers utilize various network access approaches (e.g. Internet, Satellite communication network, cable television network, wireless broadband network, computer network and local telephone network, etc) to establish an electronic publication renting network platform comprised of information service grids, where the electronic publication renting network platform is able to allocate resources among the grid nodes.

The group of service administration grid nodes established according to the present invention can organize itself automatically, arbitrarily add or delete at any time the nodes in the group of service provision grid nodes and the nodes in the group of service request grid nodes, and can automatically publish the service information provided by the added or deleted service provision grid node to the added or deleted service request grid node. And after the customization service request of the service request grid node is processed, the group of service administration grid nodes schedules the service provision grid node with corresponding service in the group of service provision grid nodes to provide the service. After the corresponding service provision grid node completes the service, the group of service administration grid nodes automatically calculates the service fee arising from the service provided by the service provision grid node to the corresponding service request grid node.

The group of service provision grid groups established according to the present invention can automatically publish property information, such as the customized electronic publication catalog, of each service provision grid node, wherein the property information includes the producer, publisher, service fee for purchase and renting, etc. And the group of service provision grid delivers the property information to the group of service administration grid nodes. After receiving the service request information sent from the group of service administration grid nodes, the group of service provision grid nodes builds service relationship with the corresponding service request grid node and provides related service. The service content includes submitting the content code and the content key of the electronic publication. After the service request grid node utilizes the content code and content key to use the contents of the electronic publication, the group of service provision grid nodes completes the electronic business service of the service provision grid node and the service request grid node by exchanging information with the service administration grid node.

The group of service request grid nodes established according to the present invention can automatically acquire property content information of electronic publications that are provided by the group of service provision grid nodes and published by the group of service administration grid nodes. The service request grid node in the group of service request grid nodes is able to utilize a general television set and a multi-media terminal to browse the property information of the electronic publication and individually select the electronic publication that needs to be consumed. The group of service request grid nodes builds up a service relationship with the service provision grid node via the service administration grid node and is able to acquire content service of the electronic publication. The service content includes submitting the content code and the content key of the electronic publication. After utilizing the content code and content key to use the contents of the electronic publication, the service request grid node pays the service fee via the network.

The electronic publication renting network platform of the present invention is established with three grid node groups, which means that it has three types of grid nodes that constitute the three groups. The first type of grid nodes is the service administration grid nodes composed of the operators of the electronic publication renting network platform; the second type of grid nodes is the service request grid nodes composed of an electronic publication consumer group; the third type of grid nodes is service provision grid nodes composed of an electronic publication publisher group. The electronic publication renting is accomplished through the information exchange, content delivery, fee payment among the three types of grid nodes.

The detailed method for establishing the electronic publication renting network platform composed of the foregoing information service grids include:

<1> Establishing the group of service administration grid nodes of the electronic publication renting network platform, comprising: utilizing Web Service approach, utilizing Open Grid Services Architecture (OGSA), eliminating heterogeneous resource differences for the service administration grid nodes, hiding spatial related characteristic of the service administration grid nodes, and loading information communication and management service software on the various computers having multi-user and multi-task functionalities to establish the service administration grid nodes. The service administration grid nodes are connected to the network via communication links. A first type of grid nodes—service administration grid nodes is established. The service administration grid nodes have the functions for providing various service request paths, processing on-line service computation and handling service matchmaking, etc., on the electronic publication renting network platform. The service administration grid nodes constitute the group of service administration grid nodes on the electronic publication renting network platform.

<2> Establishing the group of service provision grid nodes of the electronic publication renting network platform, comprising: utilizing Web Service approach, utilizing Open Grid Services Architecture (OGSA), eliminating heterogeneous resource differences for the service provision grid nodes, hiding spatial related characteristic of the service provision grid nodes, and loading information coding software and random key generation software on the various computers having multi-user and multi-task functionalities to establish the service provision grid nodes. The service provision grid nodes are connected to the network via communication links. A third type of grid nodes—service provision grid nodes is established. The service provision grid nodes provide functions for processing property information of the electronic publications, processing electronic publication contents, and processing keys for the electronic publication services, etc., on the electronic publication renting network platform, constituting the group of service provision grid nodes on the electronic publication renting network platform.

<3> Establishing the group of service request grid nodes of the electronic publication renting network platform in which: configuring a multi-media terminal with Digital Rights Management feature and a remote controller, using a general television set for playback, and allowing to connect the service request grid nodes to the platform through network access approaches, specifically, connecting the service provision grid nodes to the grid by various network access approaches of the multi-media terminal. The multi-media terminal of the service request grid node automatically searches the service administration grid node in the group of service administration grid nodes through embedded software, and acquires the property content information of the electronic publication published by the service administration grid node. After browsing the catalog and selecting the service, the service request grid node builds connection of service relationship with the corresponding service provision grid node via the service administration grid node. After receiving the content code and content key of the electronic publication provided by the service provision grid node, the service request grid node is able to provide video signals via CODEC circuitry to the general television set for playback under both circumstances when the service request grid node is connected to the network or disconnected to the network. Establishing as the second type of grid nodes—service request grid nodes that have the functions for handling electronic publication selection and playback and handling payment of service fee, that are able to automatically search the service administration grid node, dynamically establish relationship with the service provision grid node and enable the general television set to play the service content in the electronic publication renting network platform. The service request grid nodes constitute the group of service request grid nodes on the electronic publication renting network platform.

As previously described, the organization of the established electronic publication renting network platform varies dynamically. The three types of grid nodes exchange information using the Simple Object Access Protocol (SOAP), which is one of the background technologies and has an interoperability feature, and using the Extensible Markup Language (XML). During the variation of service information and content information and the variation of the operation environment, the platform constantly performs self-monitoring and optimizes operation status, and independently dynamically configures itself. If the platform is found to be attacked from an unknown source or a potential problem of a fault is found, the platform may control the organization of itself and readjusting the its service features by automatically setting its strategy rule (including service selection), service mapping, and issue handling, etc., so as to enable the platform to operate normally and stably and ensure that the platform delivers high-quality service.

It is a virtualized tremendous electronic publication renting network platform that the service requesters are faced with. With the interaction among the service request grid nodes, the service administration grid nodes, and the service provision grid nodes, the users of the service request grid nodes just need to face with a friendly and concise directory page layout without knowing the spatial location of the service provision grid nodes, which makes it possible for the users of the service request grid nodes to acquire services of the electronic publication renting network platform at anywhere and anytime.

The method for establishing the electronic publication renting network platform enjoys the following distinguished features:

<1> As previously described, the establishing method of the present invention is to store the content code and content key of the electronic publication through the multi-media terminal device. After the storing is done, the content service that has acquired copyright information and service information can be used in the case of disconnecting from the information service grid. The users of the service request grid node group utilize general televisions for playback when consuming electronic publication renting services, where no computers are required.

<2> As previously described, the multi-media terminal of the service request grid node of the present invention is provided with various network access approaches. The embedded software of the multi-media terminal automatically searches the service administration grid node. With the assistance of the service administration grid node, the embedded software of the multi-media terminal automatically searches the most desirable network routing to acquire the electronic publication contents. The service request grid node may use Service On Demand and One Click Is Enough service.

<3> As previously described, the establishing method of the present invention is to provide a platform similar to an operation system. The platform eliminates heterogeneous resource difference of each grid node, hides spatial property of each grid node, and provides, through information exchanges between each grid node, a virtualized tremendous storage space for electronic publication contents, which has no limitation of its capacity. On this platform, the way of information processing is distributed, synergic and intelligent. Its service provision grid nodes and service request grid nodes can be added arbitrarily.

<4> As previously described, the service provision grid nodes may add or delete the property information of the electronic publications freely and the information of addition or deletion is automatically published to the service request grid nodes through the electronic publication renting network platform, which enable the electronic publication publisher group to control the publication and services of the free electronic publications independently and allow the service contents of the platform to be expanded constantly where the increasingly rich service contents will attract more service request consumption.

<5> As previously described, due to the effect that the service request grid node automatically searches the service administration grid node, the administration of the platform operation, in the case of reserving at least one service administration grid node, is allowed to automatically add or delete the service administration grid nodes so as to expand the processing capability of the network flexibly and conveniently and to be adapted to the changes of numbers of the service request grid nodes acquiring platform services.

<6> As previously described, the services of the electronic publication renting network platform established according to the present invention are enabled by the service requests of the service request grid nodes. The program contents are rented to the multi-media terminals of the service request grid nodes via grid service. There is no limitation of service time. The contents when being played are not subject the bandwidth of the network. Consequently, the electronic publication renting network platform established according to the present invention enjoys reliable quality and has sound service quality warranty.

<7> As previously described, since the electronic publication contents are organized by the service provision grid nodes independently, the encoding method, key computation and playback manners are specified by the service provision grid nodes. The service request grid nodes may only be able to use the services after acquiring the property of encoding method, key computation and playback manners, etc. provided by the service provision grid nodes.

<8> As previously described, the background technologies of the electronic publication renting network platform adopt the Simple Object Access Protocol (SOAP) with interoperability feature, the Extensible Markup Language (XML), the Open Grid Services Architecture (OGSA) and the Grid Service. These background technologies have sound foundation. It is convenient to add functions.

<9> As previously described, employing the electronic publication renting network platform established according to the present invention and utilizing various service request paths (various on-line service paths such as Call Center, network on-line, short mobile message) enable the serving party to request for different location and different time with the served party.

DETAILED DESCRIPTIONS OF PREFERRED EMBODIMENTS

Methods of the present invention will further be presented hereinafter with reference to the accompanying drawings and the detailed embodiments.

Figure 1:
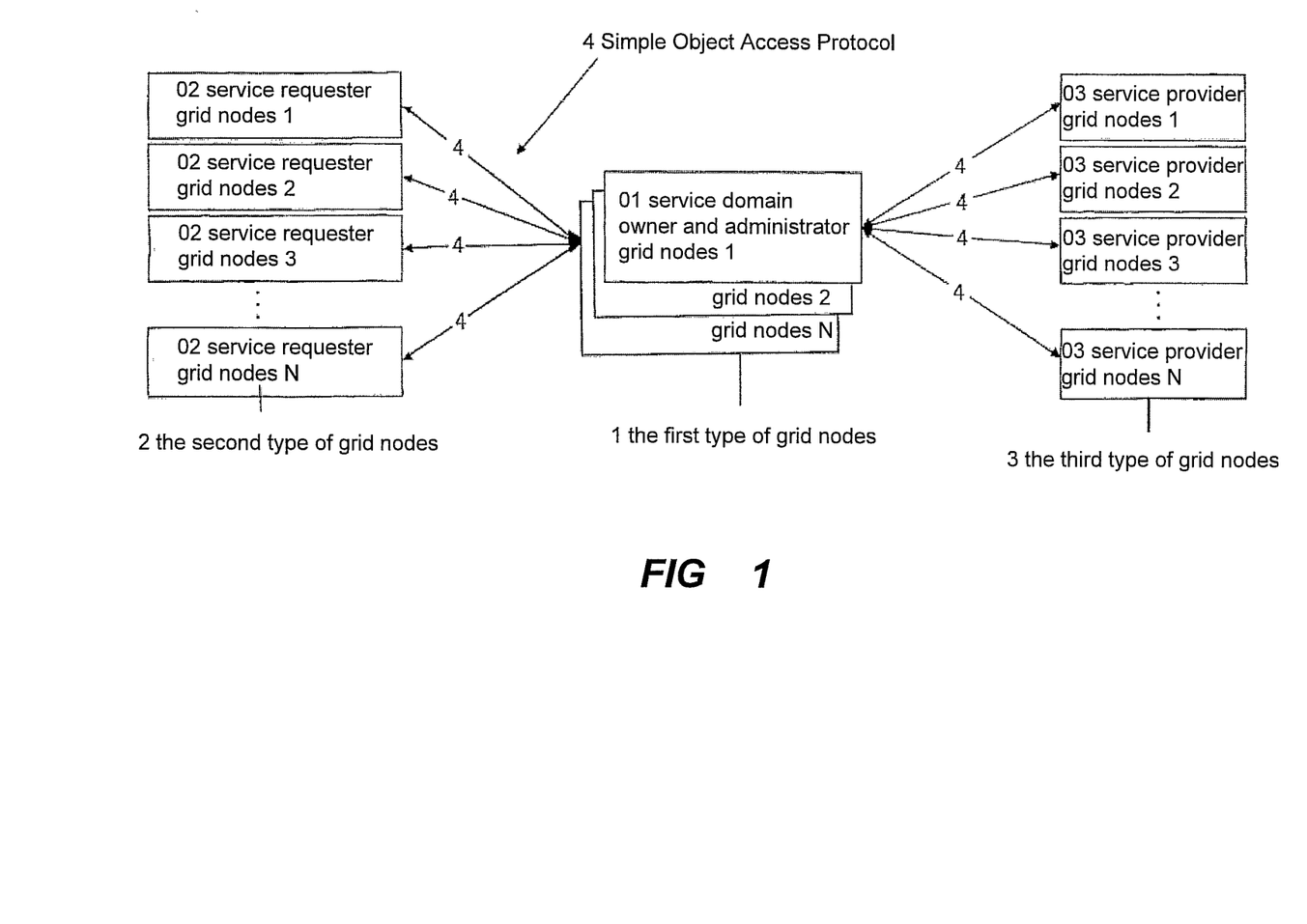
FIG. 1 illustrates platform architecture established through a method for establishing electronic publication renting network platform according to the present invention.

FIG. 1 illustrates architecture of the electronic publication renting network platform established according to the present invention. As shown in FIG. 1, the method of the present invention includes building three types of grid node group in which:

establish a group of service administration grid nodes which is composed of 1~n grid nodes of first type (so as to undertake tasks of platform administration and arrangement of request service, where the service administration grid nodes 01 may be referred to as service domain owner and administrator grid nodes).

establish a group of service provision grid nodes which is composed of 1~n grid nodes of third type so as to undertake the task of content publication of the electronic publication publisher, where the service provision grid nodes 03 shown in FIG. 1 may also be referred to as service provider grid nodes.

establish a group of service request grid nodes 02 which is composed of 1~n grid nodes of second type so as to undertake the task of content request of the electronic publication consumer group, where the service request grid nodes 02 shown in FIG. 1 may also be referred to as service requester grid nodes.

The group of service administration grid nodes conducts content property delivery with the group of service provision grid nodes via Simple Object Access Protocol communication 4. The group of service administration grid nodes conducts content request delivery with the group of service request grid nodes via Simple Object Access Protocol communication 4. The group of service provision grid nodes and the group of service request grid nodes conduct content data delivery.

The foregoing three types of information service grid node groups constitute the electronic publication renting network platform.

The detailed method for establishing the foregoing electronic publication renting network platform is described below:

<1> establishing the group of service administration grid nodes of the electronic publication renting network platform includes: utilizing various computer systems having multi-user and multi-task functionalities, adopting Web Service approach and Open Grid Services Architecture (OGSA) to establish 1 to n service administration grid nodes 01, eliminating heterogeneous resource differences of the 1~n service administration grid nodes, hiding spatial related characteristic of the 1~n service administration grid nodes, establishing the group of service administration grid nodes on the electronic publication renting network platform (information service grid), which has various service request paths, has on-line service computation function and has service matchmaking function, undertaking the management and direction of the electronic publication renting network platform.

<2> establishing the group of service provision grid nodes of the electronic publication renting network platform includes: utilizing various computer systems having multi-user and multi-task functionalities, adopting Web Service approach and Open Grid Services Architecture (OGSA) to establish 1~n service provision grid nodes 03, eliminating heterogeneous resource difference of the 1~n service provision grid nodes, hiding spatial related characteristic of the 1~n service provision grid nodes, establishing the group of service provision grid nodes on the electronic publication renting network platform (information service grid), which includes various electronic publication contents and is capable of conducting grid services with the group of service administration grid nodes and the group of service request grid nodes, undertaking content provision of the electronic publication renting network platform.

<3> establishing the group of service request grid node group of the electronic publication renting network platform includes: configuring a multi-media terminal with Digital Rights Management feature to establish 1 to n service request grid nodes 02, wherein the multi-media terminal operates with a remote controller, utilizes a general television set to browse the directory and play the contents and have various network access approaches, establishing the group of service request grid nodes on the electronic publication renting network platform (information service grid), which employs various electronic publication contents and is able to conduct grid services with the group of service administration grid nodes and the group of service provision grid nodes, undertaking content consumption of the electronic publication renting network platform.

There is no limitation on the number of the service administration grid nodes, the service request grid nodes and the service provision grid nodes established in the electronic publication renting network platform established according to the present invention. As illustrated in FIG. 1, the first grid node group—1~n service administration grid nodes 01 in the service administration grid node group, the second grid node group—1~n service provision grid nodes 03 in the service provision grid node group, and the third grid node group—1~n service request grid nodes 02 in the service request grid node group have no limitation on their numbers.

As mentioned above, the electronic publication renting network platform established according to the present invention has the functionalities of service request analysis, automatic search carried out by the service request grid node group and service computation and has Service On Demand and One Click Is Enough service.

As illustrated in FIG. 1, the group of service administration grid nodes on the electronic publication renting network platform at least includes one service administration grid node 01. The group of service provision grid nodes at least includes one service provision grid node 03. The group of service request grid nodes at least includes one service request grid node 02. Moreover, the electronic publication renting network platform is provided with functions of content, automatic reorganization of property information for service content and arbitrary addition or deletion of the service content by the service provision grid nodes.

As illustrated in FIG. 1, the 1~n service administration grid nodes 01 in the group of service administration grid nodes and the 1~n service provision grid nodes 03 in the group of service provision grid nodes on the electronic publication renting network platform conduct content property delivery using a background technology of Simple Object Access Protocol (SOAP) with interoperability feature; The 1~n service administration grid nodes 01 in the group of service administration grid nodes and the 1~n service request grid nodes 02 in the group of service request grid nodes on the electronic publication renting network platform conduct content request delivery using a background technology of Simple Object Access Protocol (SOAP) with interoperability feature.

Below is the request for acquiring server address sent from 1~n service request grid nodes 02 to 1~n service administration grid nodes 01.

```
=== request envelop begin ===
<?xml version="1.0" encoding="UTF-8"?>
<SOAP-ENV:Envelope
xmlns:SOAP-ENV="http://schemas.xmlsoap.org/soap/envelope/">
<SOAP-ENV:Header>
<SoapHeaderClass>
<STBID>0050C2262000</STBID> (STB ID)
<CardID>86430A5FC3122726</CardID> (Smart Card ID)
<ValidCheck>24FA8798FF361F913B83BD6F1F8F3C8D</ValidCheck>
(Authority code,
Authentication code)
<Language>ZH_CN</Language> (STB Language)
</SoapHeaderClass>
</SOAP-ENV:Header>
</SOAP-ENV:Body>
<RequestServerIP> (Request method)
<MAC>0050C2262000</MAC> (STB MAC address)
</RequestServerIP>
</SOAP-ENV:Body>
</SOAP-ENV:Envelope>
=== request envelope end ===
```

Below is the response to acquiring server address service provided from 1~n service administration grid nodes 01 to 1~n service request grid nodes 02.

```
=== response envelope begin ===
<?xml version="1.0" encoding="UTF-8"?>
<soap:Envelope emlns:soap="http://schemas.xmlsoap.org/soap/envelope/">
        <soap:Body>
                <RequestServerIPResp xmlns="http://www.mv3.cn/services"> (Request for response)
<RequestServerIPResult>http://211.161.197.178/WebService/</RequestServerIPResult>
            </RequestServerIPResp> (Response result, indicating the addresses of the available
servers)
            </soap:Body>
</soap:Envelope>
=== response envelope end ===
```

The foregoing Simple Object Access Protocol (SOAP), one of the background technologies used in the present invention, is a simple protocol for information exchange in a decentralized or distributed environment and is a protocol based on Extensible Markup Language (XML). As a communication protocol, the Simple Object Access Protocol can be implemented in various programming languages under various operation systems (e.g. Windows, Solaris, Mac OS UNIX, LINUX, etc) and on various computer platforms (e.g. IBM PC, APPLE Power MAC, SUN WorkStation, etc). The Simple Object Access Protocol includes four parts: 1) Simple Object Access Protocol envelop (SOAP envelop) which defines what the content of an information description is, who sends it, who should receive and process it and how to process their frameworks; 2) Simple Object Access Protocol encoding rules (SOAP-encoding-rules) which is used to represent instances of the data types required by application programs; 3) Simple Object Access Protocol representation (SOAP RPC representation) which represents protocols for remote procedure call and answer; 4) Simple Object Access Protocol binding (SOAP binding) which utilizes base layer protocol to exchange information (such as the following example of SOAP protocol, etc).

Figure 2:
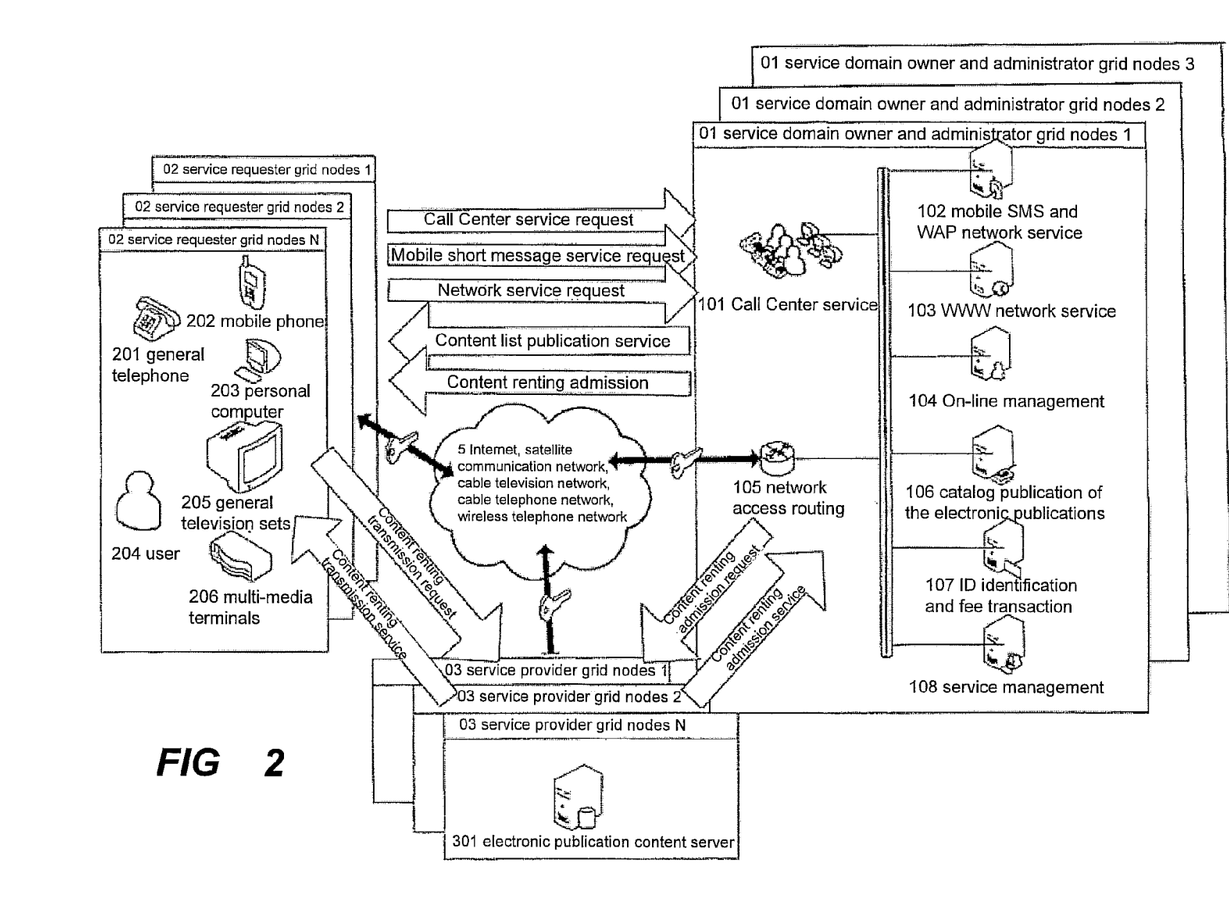
FIG. 2 illustrates detailed architecture of an embodiment of various grid nodes on the electronic publication renting network platform established according to a method of the present invention.

As shown in FIG. 2, the service administration grid nodes in the group of service administration grid nodes are responsible for configuring the operation strategy and monitoring center behavior, which includes registration and cancellation of the provided service instances, maintenance of its control of the service quality and execution the processing of the manual faults transfer; responsible for ID identification of the service provision grid node 03 and the service request grid node 02, service management, data safety; responsible for publication and delivery of the catalogs of the electronic publications, etc; responsible for service fee collection and payment.

The electronic publication renting network platform established according to the present invention includes request service paths such as Call Center service, network service and mobile short message service, etc. As illustrated in FIG. 2, the service administration grid nodes (service domain owner and administrator grid node) 01 in the group of service administration grid nodes established with Call Center 101, mobile short message and WAP network service 102, WWW network service 103, on-line management 104, catalog publication of the electronic publications, ID identification and fee transaction 107, service management 108 and network access routing 105.

Call Center service 101 receives service requests which are manually sent to the service administration grid nodes 01 from the 1~n service request grid nodes 02 using (optional) general telephone service 201. The Call Center service includes business consultation, account query, content renting, user complaints, etc. The detailed content of the service includes:

business consultation, which introduces features, usages, charging methods, etc. to the users;

account query, which provides real-time account information to the users;

renting content, which accepts and confirms the service requests of the users;

user complaints, which receives the user complaints and records reasonable suggestions from the users as well.

Mobile short message service and WAP network service 102 response to the service requests sent to the service administration grid nodes 01 by short message from the 1~n service request grid nodes 02 using (optional) mobile phone service 202, and, at the meantime, return conformation information by short message.

Network service 103 responses to the service requests sent to the service administration grid nodes 01 by means of network browsing from the 1~n service request grid nodes 02 using (optional) web service. The utilization of the network service of the World Wide Web (WWW) includes business consultation, account query, content renting, user complaints, etc. The detailed content includes:

business consultation, which introduces features, usages, charging methods, etc. to the users;

account query, which provides real-time account information to the users;

renting content, which accepts and confirms the service requests of the users;

user complaints, which receives the user complaints and records reasonable suggestions from the users as well.

The catalog publication of the electronic publications 106 is responsible for publishing the electronic publication catalogs provided by the 1~n service provision grid nodes 03 of the service provision grid node group to the 1~n service request grid nodes 02 of the service request grid node group.

ID confirmation and fee transaction 107 is responsible for the ID identification and fee management when renting service occurs between the 1~n service provision grid nodes of the service provision grid node group and the 1~n service request grid nodes 02 of the service request grid node group.

The service management 108 monitors the on-line status of the 1~n service provision grid nodes 03 of the service provision grid node group and the 1~n service request grid nodes 02 of the service request grid node group and is responsible for matchmakings for the service requests requested by the 1~n service request grid nodes 02 and the service instances provided by the 1~n service provision grid nodes 03.

Network access routing 105 undertakes to connection to various networks 5, including Internet, Satellite network, wireless network, cable television network, cable telephone network, and wireless telephone network, etc.

As illustrated in FIG. 2, the users 204 of the service provision grid nodes 02 in the group of service provision grid nodes may utilize the multi-media terminals 206 and the general television sets 205 to order services, and conduct service selection on the general television sets 205 through the remote controller of the multi-media terminal 206. The users may also use personal computers (web page request) 203 to acquire services via network service 103; choose mobile phones 202 requesting to acquire services through mobile short message service 102; choose general telephone 201 requesting to acquire services through Call Center with operator service 101. These service requests may conduct service order through Satellite communication network, wireless communication network, cable television network, telephone network and a plurality of broadband networks.

As illustrated in FIG. 2, the electronic publication contents 301 of the service provision grid nodes 03 in the group of service provision grid nodes may carry out design and build-up of physical location according to the self-condition of the service provision grid nodes 03. (e.g. stored in the local service provision grid nodes 03 or IDC, etc.) The logical locations (i.e. the domain names on the network or fixed IP addresses) of the service provision grid nodes 03 must be registered to the service administration grid nodes 01 on the electronic publication renting network platform.

The service provision grid nodes 03 manage their own content data and submit property information of service contents to the service administration grid nodes 01 under the direction of the service administration grid nodes 01. According to the data from the group of service provision grid nodes and the customization requests from the service request grid nodes 02, the service administration grid nodes 01 will compute and combine them as the property information of the service content and deliver the property information of the service content to the service request grid nodes 02. The electronic publication publishers may do on-line maintenance and provide the property information of the service content. The service provision grid nodes 03 will register the services composed of the provided property information of the service contents to the electronic publication renting network platform, and may also cancel the provided services. Registration and cancellation of the services will result in addition or deletion of service instances in the service instance list. The service provision grid nodes 03 will select the requests of the service request grid nodes 02. The direction of service administration grid nodes 01 will use the requesting relationship as part of it strategy configuration to perform mapping.

As illustrated in FIG. 2, user 204 may make service request by using general telephone 201, mobile phone 202, personal computer 203 or multi-media terminal 206 through Call Center operator service 101, mobile short message service 102, network order service 203 (website browsing service or wireless website browsing service, Wireless Application Protocol (WAP)), or by directly clicking the multi-media terminal 206, i.e., the user 204 may use the remote controller (or directly operate the button) to operate at the multi-media terminal 206. In other words, the foregoing established service requester grid nodes 02 are able to establish communication with the service domain owner and administrator grid nodes 01 and the service provider grid nodes 03 through various networks 5 including Internet, satellite communication network, cable television network, wireless broadband network, computer network and local telephone network, etc, and is able to achieve the advanced interoperability feature by utilizing Simple Object Access Protocol (SOAP) having interoperability feature and Extensible Markup Language (XML) information processing framework (as mentioned above). The service requester grid nodes 02 may receive service through multi-media terminals 206. The service requester grid nodes 02 may rent and purchase the electronic publications published by the service provider grid nodes 03 via a plurality of service paths provided by the service domain owner and administrator grid nodes 01 and pay the service fee. The service requester grid nodes 02 may read the electronic publications at any time in compliance with the digital right management approach.

As illustrated in FIG. 2, the detailed architecture of the grid node for the established service provider grid nodes 03 is: establishing the service provider grid nodes 03 which at least include one electronic publication publisher on the third type of grid nodes 3; configuring electronic publication content server 301 on the service provider grid nodes 03. The content data storage of the service provider grid nodes 03 may carry out design and build-up physical location according to the self-condition of the service provider grid nodes 03. (e.g. stored in the local service provider grid nodes 03, IDC, etc.) The logical locations (i.e. the domain names on the network or fixed IP addresses) of the service provider grid nodes 03 must be registered to the service domain owner and administrator grid nodes 01 on the electronic publication renting network platform.

The service provider grid nodes 03 manage their own content data and submit content lists and data of brief introduction to the electronic publication renting network platform under the direction of the service domain owner and administrator grid nodes 01. According to the data from a plurality of service provide gird nodes 03 and the customization request from the service requester grid nodes 02, the electronic publication renting network platform will automatically combine them as a renting content list and deliver the renting content list to the service requester grid nodes 02.

The established service provider grid nodes 03 as illustrated in FIG. 2 may establish communication with the service domain owner and administrator gird nodes 01 and the service requester grid nodes 02 through various networks 5 including Internet, satellite communication network, cable television network, wireless broadband network, computer network and local telephone network, etc, and may achieve the advanced interoperability feature by utilizing EML information processing framework provided by the Simple Object Access Protocol (SOAP) having interoperability feature. The service provider grid nodes 03 may do on-line maintenance to the content of the electronic publications provided by them, and collect the service compensation (service fee, etc.) from the service domain owner and administrator gird nodes 01 after providing services to the service requester grid nodes 02. The service provider grid nodes 01 will store the contents of their electronic publications in the content group units (publisher units, physical locations can be local places of the publishers or different places) on the platform. The electronic publication publishers may do on-line maintenance and provide electronic publication content. The service provider grid nodes 03 will register the provided services on the electronic publication renting network platform, and may also cancel the provided services. Registration and cancellation of the services will result in addition or deletion of service instances in the service instance list in the service domain. The service providers will make selection among providers' service requests provided to the electronic publication renting network platform to register their service instances. The service providers will not make choice to support what kind of user services. The electronic publication renting network platform will use such relationship as part of it strategy configuration to perform mapping.

Figure 3:
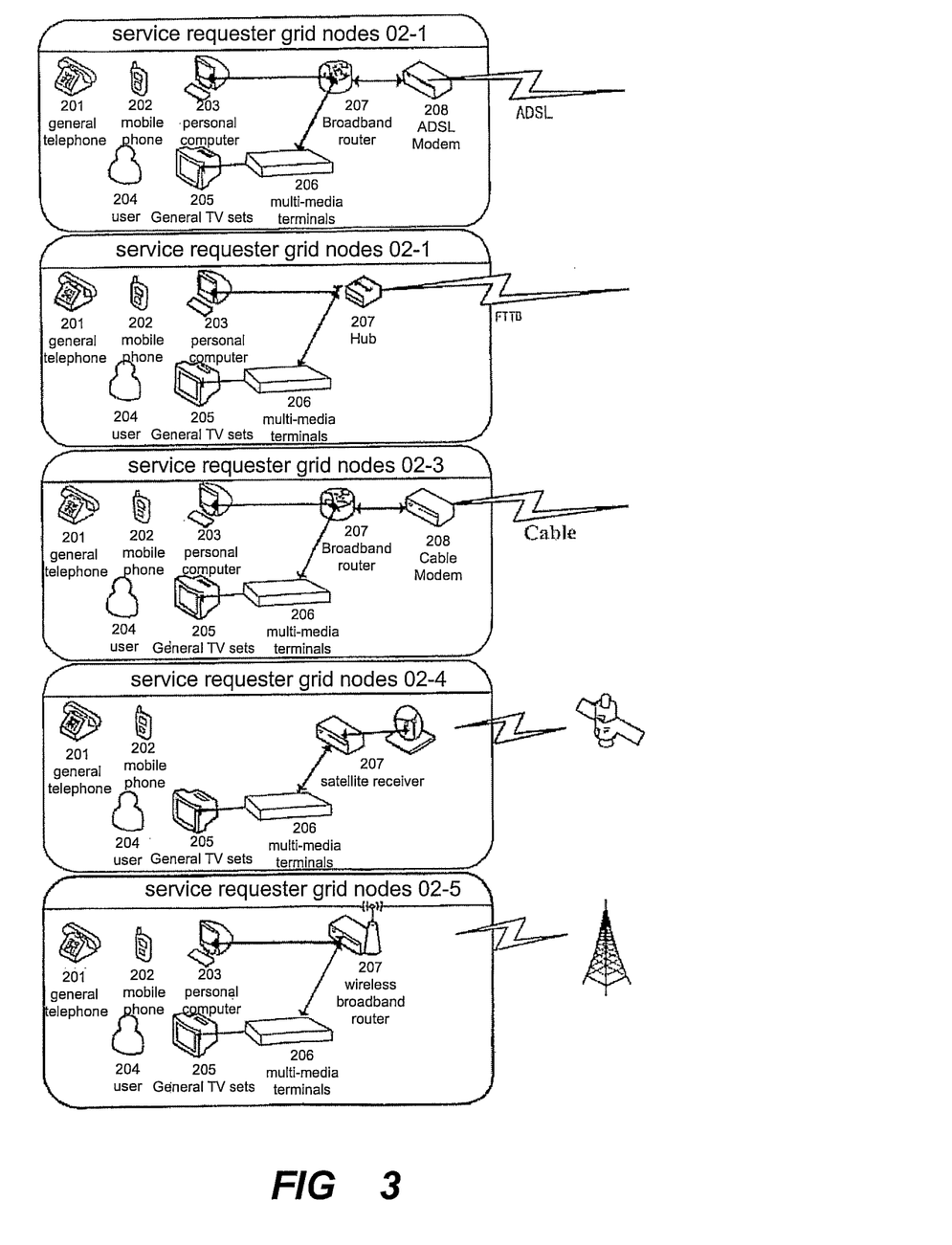
FIG. 3 illustrates various network access modes for the service request grid nodes established through a method for establishing electronic publication renting network platform according to the present invention.

FIG. 3 illustrates a plurality of methods for accessing the networks for the service request grid nodes.

The group of service request grid nodes established according to the present invention is able to employ access approaches of Internet, or satellite communication network, or cable television network, or wireless broadband network, or computer network, or local telephone network to access the electronic publication renting network platform. As illustrated in FIG. 3, the 1~n service request grid nodes 02 utilize a plurality of access approaches to acquire the services of the electronic publication renting network platform.

When the service request grid node 02-1 utilizes ADSL (Asymmetrical Digital Subscriber Line) to access the network, a broadband router 207 (ADSL) can be used for access via ADSL MODEM 208 (communication gateway), which constitutes a configuration plan for the service request grid node 02-1.

When the service request grid node 02-2 utilizes FTTB (FTTB+LAN (FTTB for short): i.e. Fiber to The Building) to access the networks, a hub 207 (FTTB router) can be used for access via FTTB communication gateway, which constitutes a configuration plan for the service request grid node 02-2.

When the service requester grid node 02-3 utilizes Cable (cables of the cable television) to access networks 5, a broadband router 207 can be used for access via a Cable MODEM 208 (communication gateway), which constitutes a configuration plan for the service request grid node 02-3.

When the service request grid node 02-4 utilizes satellite communication to access the network, a digital satellite receiver 207 can be used for access via satellite communication gateway, which constitutes a configuration plan for the service request grid node 02-4.

When the service requester grid node 02-5 utilizes wireless network to access the network, a wireless communication access router 207 can be used for access via wireless communication gateway, which constitutes a configuration plan 5 for the service request grid node 02-5.

For all the foregoing configuration plans of the service request grid nodes 02, the service request grid nodes 02 may choose either one of the configuration plans to connect to the networks. Among all the configuration plans, the service request grid nodes 02 all utilize general television sets 205 and multi-media terminals 206 to appreciate electronic publications. The present invention builds up a function that can use the general television sets to independently play the authorized information content off-line after the group of service request grid nodes acquires the service. Download method can be employed to complete the playback of the authorized information content. The playback mode established on the service request grid nodes 02 is to be disconnected from the network to independently play the information content that is authorized to play, or to connect to the network to play the information content that is authorized to play.

The information service grid method that utilizes Service On Demand or One Click Is Enough service (i.e. browse information content directly through the multi-media terminal) is established on the service provider grid nodes of electronic publication renting network platform.

Among all the configuration plans of the service request grid nodes 02, the service request grid nodes 02 may make service requests to the service domain owner and administrator grid nodes 01 via the foregoing request service paths provided by the service domain owner and administrator grid nodes 01.

Figure 4:
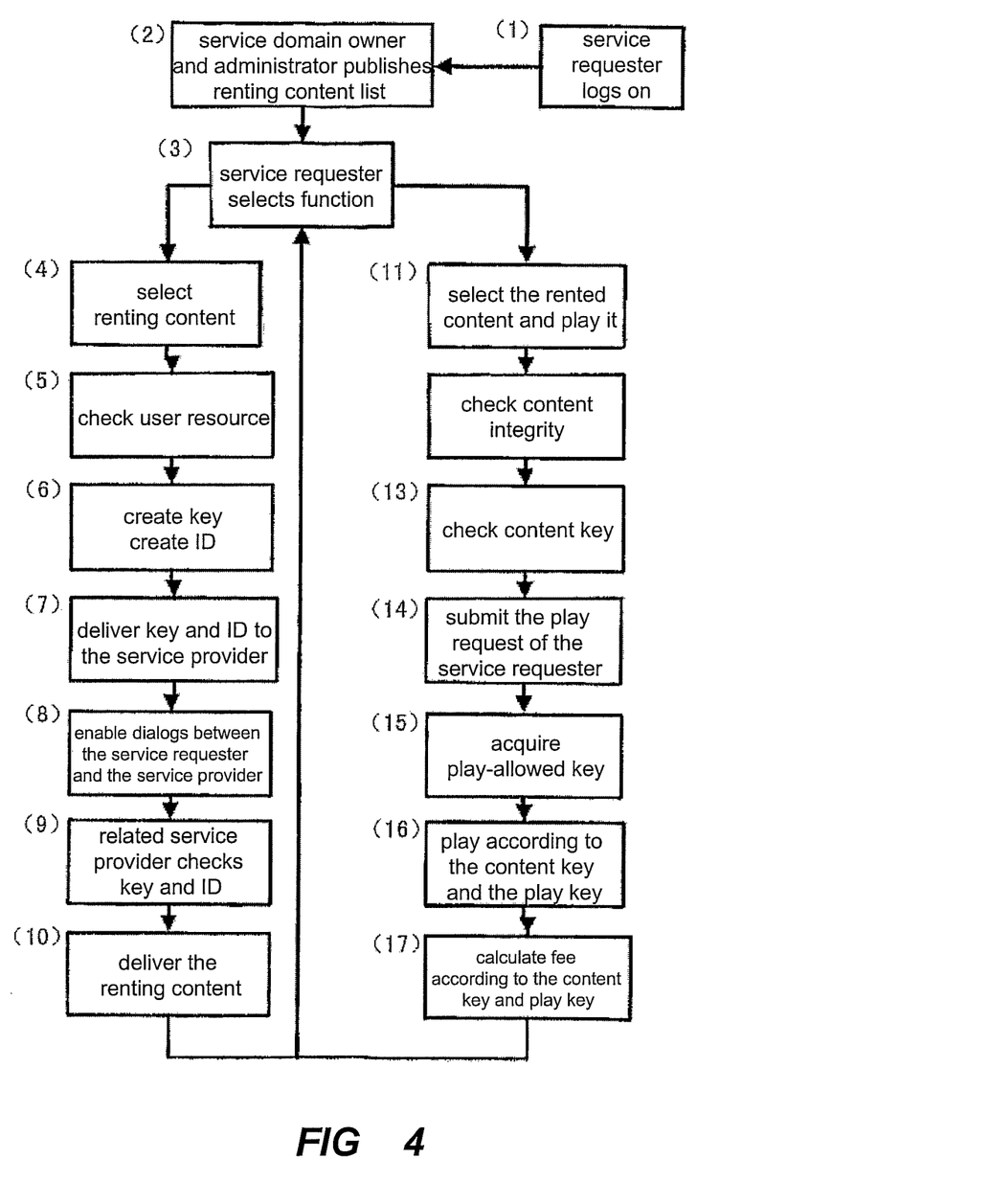
FIG. 4 illustrates a flowchart of an embodiment of requesting and acquiring service of the service request grid nodes of the electronic publication renting network platform consistent with FIG. 1 according to the method of the present invention.

FIG. 4 is a flowchart of an embodiment that the service request grid node requests and acquires services.

Step 401, the service request grid node logs on—or the service requester logs on:

When the service request grid node 02, which has already registered on the electronic publication renting network platform, opens the multi-media terminal, the service request grid node 02 will log on automatically. The service administration grid node 01 is informed that the multi-media terminal of the service request grid node 02 is on line.

Step 402, the service administration grid node 01 publishes the property information of the grid service content—or the service domain owner and administrator publishes the renting content list:

When the service administration grid node 01 is acquiring the on-line signal of the multi-media terminal of the service request grid node 02, the property information of the grid service content, or the content list, is automatically published to the multi-media terminal of the service request grid node 02.

Step 403, the service request grid node selects services:

The service request grid node 02—or the service requester, selects service functions, or renting service or playback service, at the multi-media terminal.

Step 404, service resources selection:

The service request grid node may make service resources selection—content renting selection among the property information of the grid service content through the multi-media terminal, computer, cell phone and calling system with operator service.

Step 405, service resources check—check resources of the service requester:

After the service request grid node—the service requester completes service resources selection, the service administration grid node will check resources and funds of the multi-media terminal of the service request grid node. If the requirement for the resources is not met, the multi-media terminal will require the service request grid node to select resources. If the requirement for the funds is not met, the multi-media terminal will inform the service request grid node to deal with the fund issue.

Step 406, create random dialog ID and key between the service request grid node and the service provision grid node:

After service request grid node meets the resource requirement, the service administration grid node and the service request grid node create key and creates ID. The service administration grid node and the service provision grid node creates key and creates ID such that for the service requester grid node 02 in order to enable an effective communication between the service provision grid node and the service request grid node.

Step 407, the service request grid node and the service provision grid node acquire the dialog ID and the key:

The service administration grid node delivers the dialog ID and the key to the service provision grid node. Meanwhile, the service administration grid node will also delivers the dialog ID and the key to the service request grid node.

Step 408, enable dialogs between the service request grid node and the service provision grid node:

Once the service administration grid node completes the creation and delivery for the dialog ID and the key, dialogs between the service request grid node and the service provision grid node are enabled.

Step 409, check the dialog ID and the key:

The related service provision grid node—the related service provider checks the dialog ID and the key of the service request grid node—the service requester, and establishes a delivery mechanism for the service content.

Step 410, renting content delivery, service key delivery:

The service provision grid node delivers the service (renting) content and delivers the service key to the multi-media terminal of the service request grid node.

Step 411, select the downloaded (rented) service content:

The service request grid node selects the downloaded (rented) service content to play.

Step 412, check the correctness of the content:

The multi-media terminal of the service request grid node checks the correctness and the integrity of the service content.

Step 413, check the correctness of the key:

The multi-media terminal of the service request grid node checks the service key and the key of the multi-media terminal, and generates a play request of the service request grid node.

Step 414, submit the request for playing the service:

The multi-media terminal of the service request grid node submits the play request. The service administration grid node handles the play request.

Step 415, acquire play-allowed key:

The service administration grid node calculates the play key according to the play request from the service request grid node and delivers the play key to the multi-media terminal of the service request grid node.

Step 416, play the service content according to the service content, the service key and the play key:

The multi-media terminal of the service request grid node plays the service content according to the service content, the service key and the play key.

Step 417, pay the service fee according to the service property:

The service administration grid node will calculate the fees for the renting service of the service request grid node according to the service key and the play key, and charges fees and allocates fees according to the fee calculation and the copyright agreement with the service provision grid node.

Figure 5:
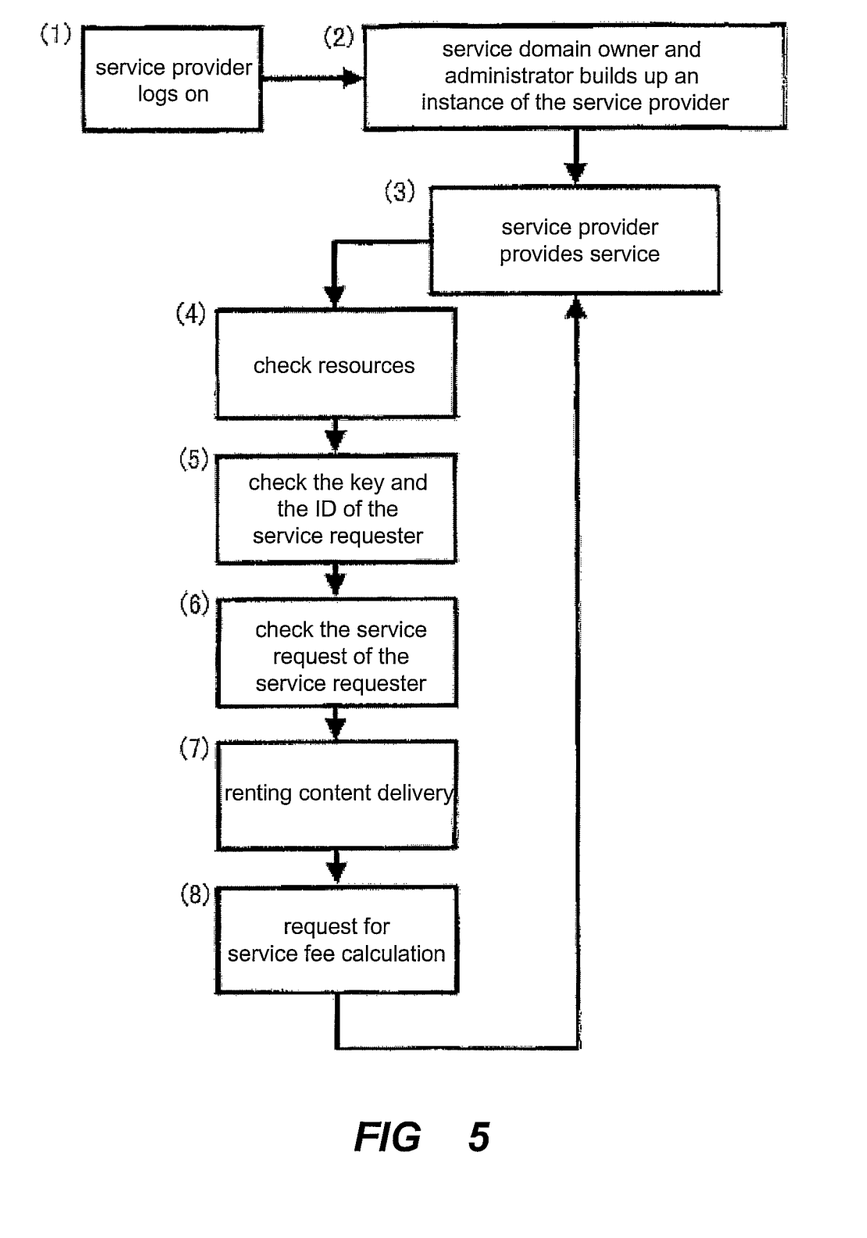
FIG. 5 illustrates a flowchart of an embodiment of acquiring service request and providing service for the service provision grid nodes of the electronic publication renting network platform consistent with FIG. 1 according to the method of the present invention.

FIG. 5 is a flowchart that the service provision grid node acquires service request and provides service.

Step 501, the service provision grid node—the service provider logs on:

When the service provision grid node that has already registered on the electronic publication renting network platform opens the node, the node will log on automatically. The service administration grid node is informed that the content service of the service provision grid node is on line.

Step 502, the service provision grid node—the service domain owner and administrator builds up an instance of the service provision grid node:

The service provision grid node delivers the property information of the service content to the service administration grid node;

Step 503, the service provision grid node decomposes the service provision instance—the service provision grid node provides service:

The service provision grid node will await the service request of the service request grid node, which is forwarded from the service administration grid node.

Step 504, check resources:

After receiving the service request of the service request grid node, which is forwarded from the service administration grid node, the service provision grid node checks the service resources.

Step 505, check the key and the ID of the service request grid node:

The service provision grid node checks the key and the ID of the service request grid node according to the service request of the service request grid node, which is forwarded from the service administration grid node.

Step 506, service resources check:

The service provision grid node decomposes the service request of the service request grid node, acquiring the request of service content, and checks the resources for the service request of the service request grid node.

Step 507, Service content delivery and service key delivery:

According to the foregoing checks for the ID, key and resources, the service provision grid node conducts content service delivery and service key delivery to the multi-media terminal of the destination for the content storage of the service request grid node.

Step 508, request for service fee calculation:

The service provision grid node completes the request service of the service request grid node, sends out a request for service fee calculation and delivers the key to the service administration grid node and charges the service fee.

What is claimed is:

1. A method for acquiring a rented electronic publication from an electronic publication renting network platform, comprising:
    1) performing a user log-in process, wherein an IP media terminal performs an automatic user log-in process when a user who has registered to a management platform of the electronic publication renting network platform opens the IP media terminal;
    2) publishing, by the management platform, a renting content list, wherein when the management platform is acquiring an online signal indicated by the IP media terminal, the management platform automatically publishes the renting content list of the renting network platform to the IP media terminal of the user and to an information device specified by the user;
    3) performing a user selecting process, wherein the user selects renting or playback function on the IP media terminal or the user performs content renting by use of a computer, a cell phone, or a call center service, the user selecting process further comprises:
        performing content selection, wherein the user selects a content to be rented by use of the IP media terminal, the computer, the cell phone, or the call center service;
        verifying user resource, wherein after the user performs content selection, the management platform verifies the resource relating to the IP media terminal of the user and verifies the user's funds;
        creating a key and an identity, wherein if the user resources meets requirements, the management platform, together with an IP media terminal of a content renting destination, creates the key and the identity such that a content group is able to conduct effective communication with the IP media terminal of the destination;
        transferring the key and the identity to a corresponding content group, wherein the key and the identity which are jointly created by the management platform and the IP media terminal of the content renting destination are submitted to the corresponding content group, via internet, for content renting authorization;
        transferring the key and the identity to a user equipment, wherein the key and the identity which are jointly created by the management platform and the IP media terminal of the content renting destination are submitted to the IP media terminal of the destination via internet such that the rented content is transferred between the IP media terminal of the content renting destination and the corresponding content group which is authorized for content renting;
    4) initiating a transfer function of the user equipment, wherein after the management platform creates and transfers the key and the identity, a transfer function of the IP media terminal of the content renting destination is automatically initiated for transferring rented content;
    5) connecting to the corresponding content group by the user using the key and the identity, wherein the content renting, wherein the user of the IP media terminal of the content renting destination connects to the corresponding content group which is authorized for content renting;
    6) verifying, by the corresponding content group, the user's key and identity, wherein the corresponding content group verifies a transfer key and the identity of user of the IP media terminal of the content renting destination and establishes a mechanism for transferring rented content;
    7) transferring the rented content, wherein the rented content is transferred between the corresponding content group authorized for content renting and the IP media terminal of the content renting destination using the mechanism for transferring rented content;
    8) selecting a rented content for playback, wherein the user of the IP media terminal of the content renting destination selects the rented content for playback on the IP media terminal;
    9) verifying content integrity, wherein the IP media terminal of the content renting destination automatically verifies the integrity of the rented content;
    10) verifying a content key, wherein the IP media terminal of the content renting destination automatically verifies the content key and the key of the IP media terminal, and generates a playback request of the IP media terminal;
    11) submitting a user's playback application, wherein the IP media terminal of the renting destination submits the playback application to the management platform;
    12) acquiring a playback key, wherein the management platform calculates the playback key according to the playback application from the IP media terminal of the renting destination and the renting application from the user and transmits the key to the IP media terminal of the renting destination;
    13) performing playback based on the content key and the playback key, wherein the IP media terminal of the renting destination performs content playback based on the content key and the playback key;
    14) performing fee calculation based on the content key and the playback key.

2. A system for acquiring a rented electronic publication from an electronic publication renting network platform that includes a server, clients and a network for connecting the server and its clients, said system comprising:
    a first module including an IP media terminal for user log-in, wherein the IP media terminal is configured to perform an automatic user log-in process when a user who has registered to a management platform of the electronic publication renting network platform opens the IP media terminal;
    a second module including the management platform, said second module for publishing, by the management platform, a renting content list, wherein when the management platform is configured to acquire an online signal indicated by the IP media terminal, the management platform automatically publishes the renting content list of the renting network platform to the IP media terminal of the user and to an information device specified by the user;

a third module including an input device, said third module for performing a user selecting process, wherein the user selects renting or playback function on the IP media terminal or the user performs content renting by use of a computer, a cell phone, or a call center service;

a fourth module for content selection, wherein the user selects a content to be rented by use of the IP media terminal, the computer, the cell phone, or the call center service;

a fifth module for verifying user resource, wherein after the user performs content selection, the management platform verifies the resource relating to the IP media terminal of the user and verifies the user's funds;

a sixth module for creating a key and an identity, wherein if the user resources meets requirements, the management platform, together with an IP media terminal of a content renting destination, creates the key and the identity such that a content group is able to conduct effective communication with the IP media terminal of the destination;

a seventh module for transferring the key and the identity to a corresponding content group, wherein the key and the identity which are jointly created by the management platform and the IP media terminal of the content renting destination are submitted to the corresponding content group, via internet, for content renting authorization;

an eighth module for transferring the key and the identity to a user equipment, wherein the key and the identity which are jointly created by the management platform and the IP media terminal of the content renting destination are submitted to the IP media terminal of the destination via internet such that the rented content is transferred between the IP media terminal of the content renting destination and the corresponding content group which is authorized for content renting;

a ninth module for initiating a transfer function of the user equipment, wherein after the management platform creates and transfers the key and the identity, a transfer function of the IP media terminal of the content renting destination is automatically initiated for transferring rented content;

a tenth module for connecting to the corresponding content group by the user using the key and the identity, wherein the user of the IP media terminal of the content renting destination connects to the corresponding content group which is authorized for content renting;

an eleventh module for verifying, by the corresponding content group, the user's key and identity, wherein the corresponding content group verifies a transfer key and the identity of user of the IP media terminal of the content renting destination and establishes a mechanism for transferring rented content;

a twelfth module for transferring the rented content, wherein the rented content is transferred between the corresponding content group authorized for content renting and the IP media terminal of the content renting destination using the mechanism for transferring rented content;

a thirteenth module for selecting a rented content for playback, wherein the user of the IP media terminal of the content renting destination selects a rented content for playback on the IP media terminal;

a fourteenth module for verifying content integrity, wherein the IP media terminal of the content renting destination automatically verifies the integrity of the rented content;

a fifteenth module for verifying a content key, wherein the IP media terminal of the content renting destination automatically verifies the content key and the key of the IP media terminal, and generates a playback request of the IP media terminal;

a sixteenth module for submitting a user's playback application, wherein the IP media terminal of the renting destination submits the playback application to the management platform;

a seventeenth module for acquiring a user's playback key, wherein the management platform calculates the playback key according to the playback application from the IP media terminal of the renting destination and the renting application from the user and transmits the playback key to the IP media terminal of the renting destination;

an eighteenth module for performing playback based on the content key and the playback key, wherein the IP media terminal of the renting destination performs content playback based on the content key and the playback key; and a nineteenth module for performing fee calculation based on the content key and the playback key.

3. An IP media terminal, comprising:

a first chip unit for user log-in, wherein the IP media terminal performs an automatic user log-in process when a user who has registered to a management platform of the electronic publication renting network platform opens the IP media terminal;

a second chip unit for content selection, wherein the user selects a content to be rented on the IP media terminal;

a third storage unit for verifying user resource, wherein after the user performs content selection, the management platform verifies the resource relating to the IP media terminal of the user and verifies the user's funds;

a fourth chip unit for creating a key and an identity, wherein if the user resources meets requirements, the management platform, together with the IP media terminal, creates the key and the identity such that a content group is able to conduct effective communication with the IP media terminal;

a fifth chip unit for transferring the key and the identity to a corresponding content group, wherein the key and the identity which are jointly created by the management platform and the IP media terminal are submitted to the corresponding content group, via internet, for content renting authorization;

a sixth data transfer unit for transferring the key and the identity to a user equipment, wherein the key and the identity which are jointly created by the management platform and the IP media terminal are submitted to the IP media terminal via internet such that the rented content is transferred between the IP media terminal and the corresponding content group which is authorized for content renting;

a seventh chip unit for initiating a transfer function of the user equipment, wherein after the management platform creates and transfers the key and the identity, a transfer function of the IP media terminal of the content renting destination is automatically initiated for transferring rented content;

an eighth coupling unit for connecting to the corresponding content group by the user using the key and the identity, wherein the user of the IP media terminal connects to the corresponding content group which is authorized for content renting;
a ninth key and identify verification unit for verifying, by the corresponding content group, the user's key and identity, wherein the corresponding content group verifies a transfer key and the identity of user of the IP media terminal and establishes a mechanism for transferring rented content;
a tenth content transfer unit for transferring the rented content, wherein the rented content is transferred between the corresponding content group authorized for content renting and the IP media terminal using the mechanism for transferring rented content;
an eleventh chip unit for selecting a rented content for playback, wherein the user of the IP media terminal selects a rented content for playback on the IP media terminal;
a twelfth content integrity verification unit for verifying content integrity, wherein the IP media terminal automatically verifies the integrity of the rented content;
a thirteenth content key verification unit for verifying a content key, wherein the IP media terminal of the content renting destination automatically verifies the content key and the key of the IP media terminal, and generates a playback request of the IP media terminal;
a fourteenth chip unit for submitting a user's playback application, wherein the IP media terminal submits the playback application to the management platform;
a fifteenth chip unit for acquiring a user's playback key, wherein the management platform calculates the playback key according to the playback application from the IP media terminal and the renting application from the user and transmits the playback key to the IP media terminal;
a sixteenth chip unit for performing playback based on the content key and the playback key, wherein the IP media terminal performs content playback based on the content key and the playback key; and
a seventeenth chip unit for performing fee calculation based on the content key and the playback key.

* * * * *